Sept. 7, 1926.  1,599,296
K. SOLBERG
GRAIN SHOCKER
Filed Oct. 10, 1924    5 Sheets-Sheet 4
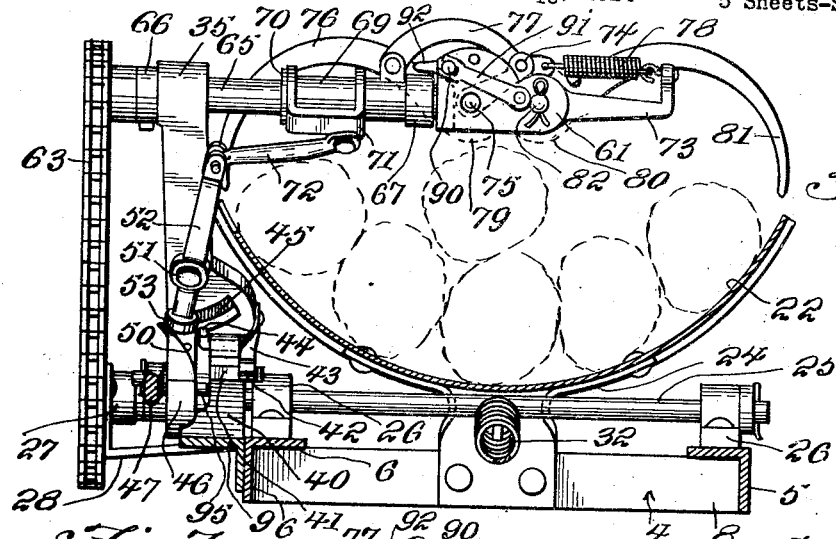
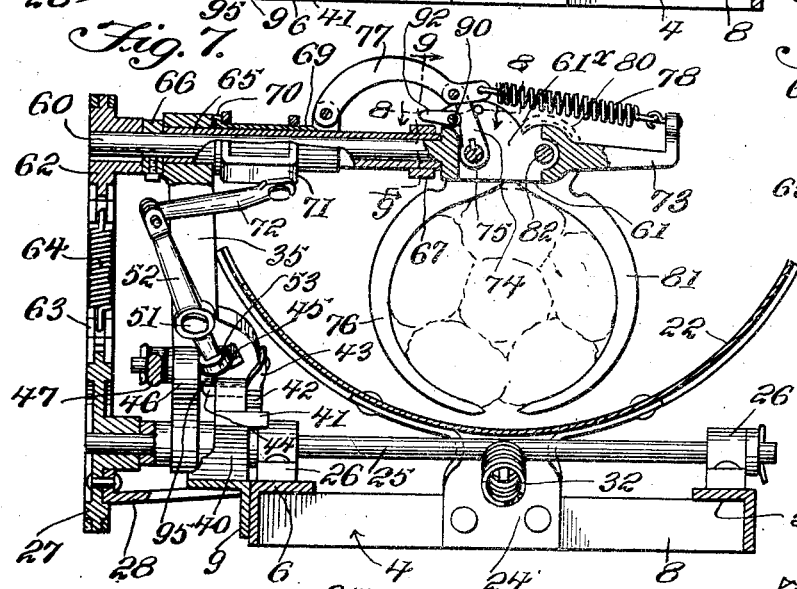
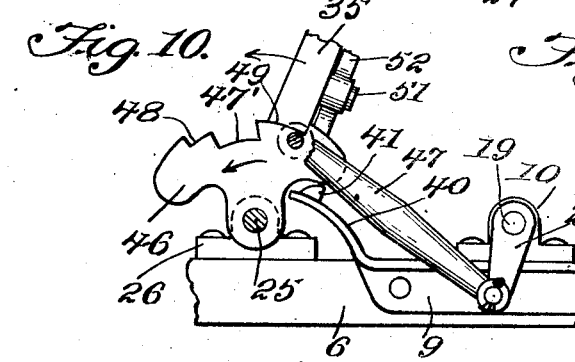

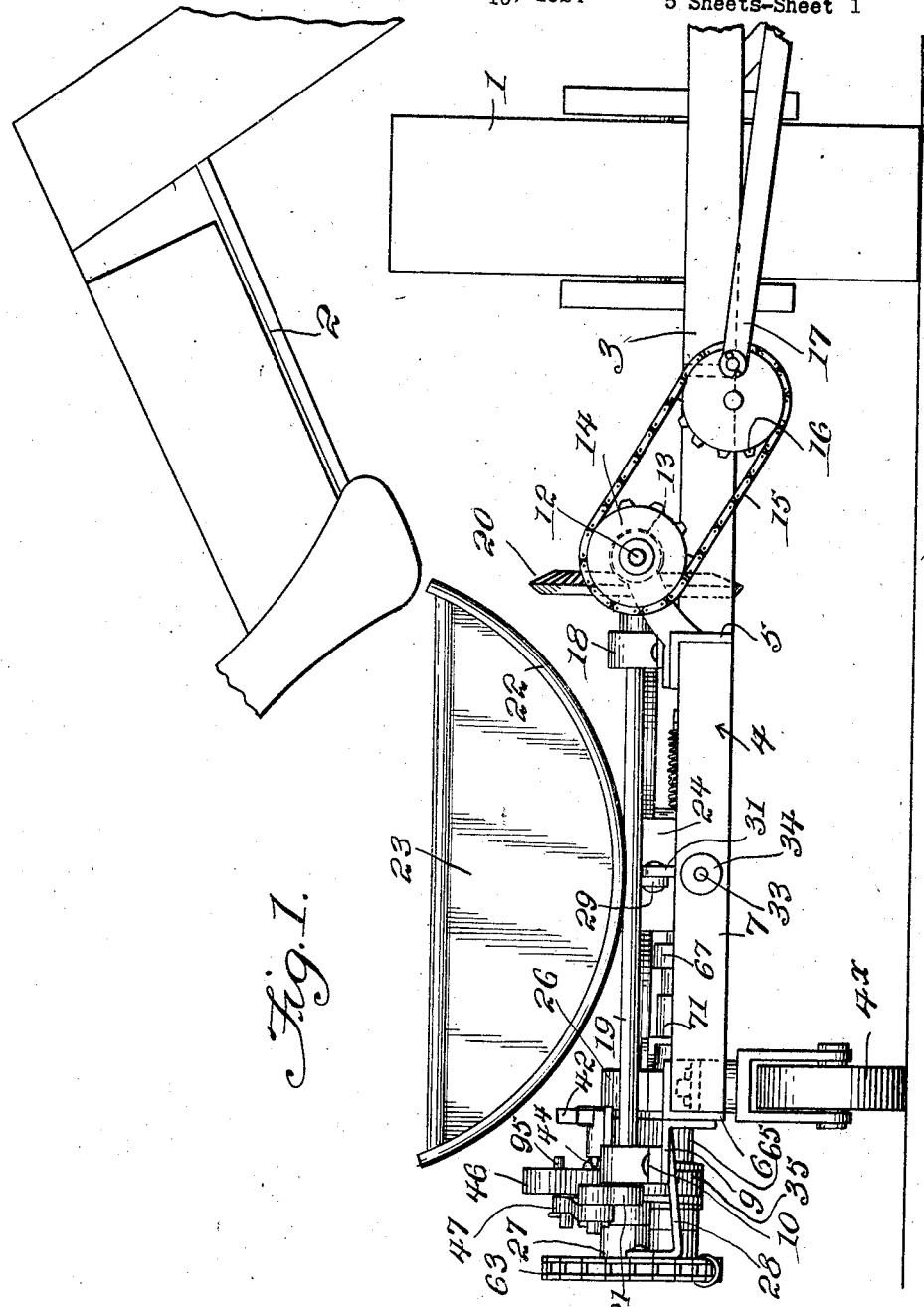

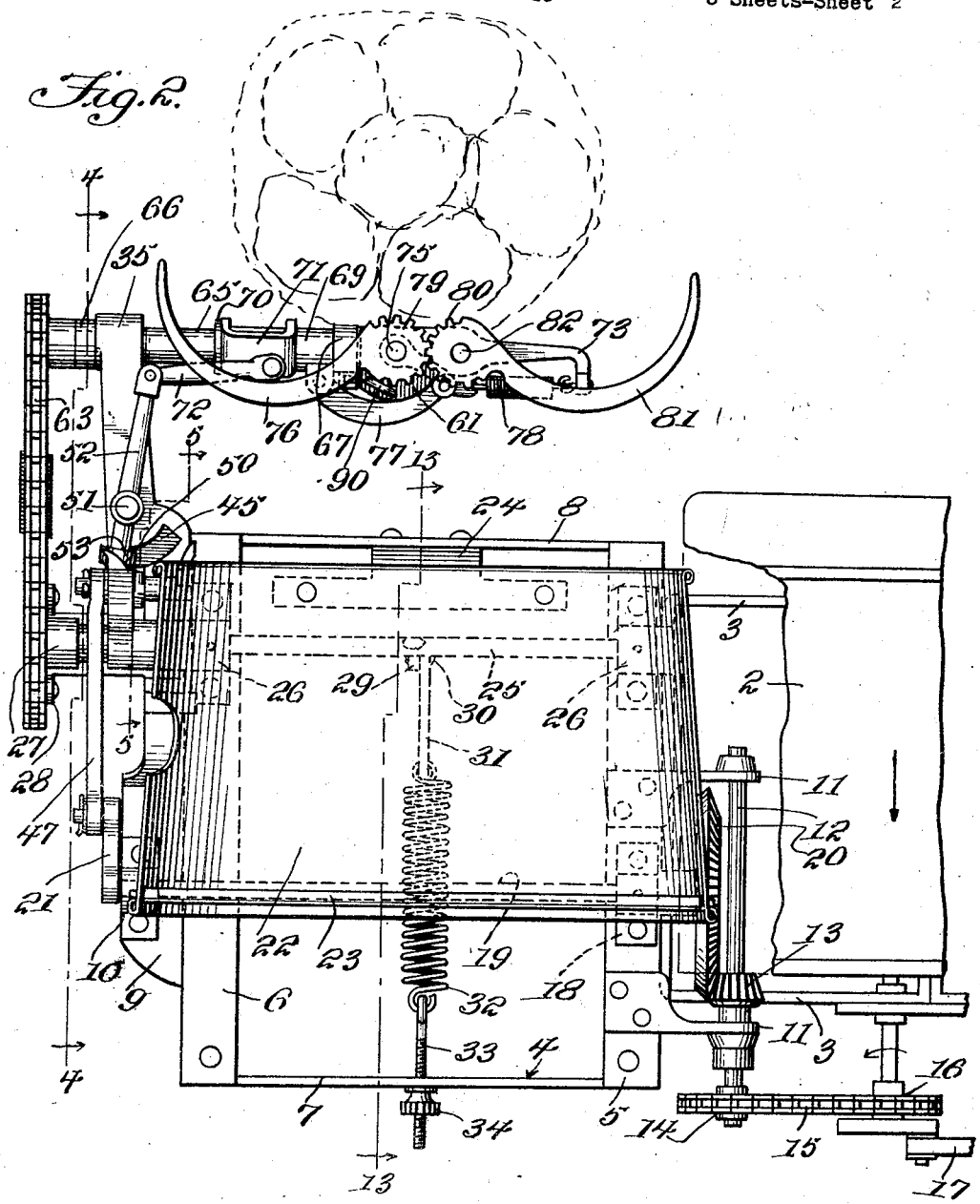

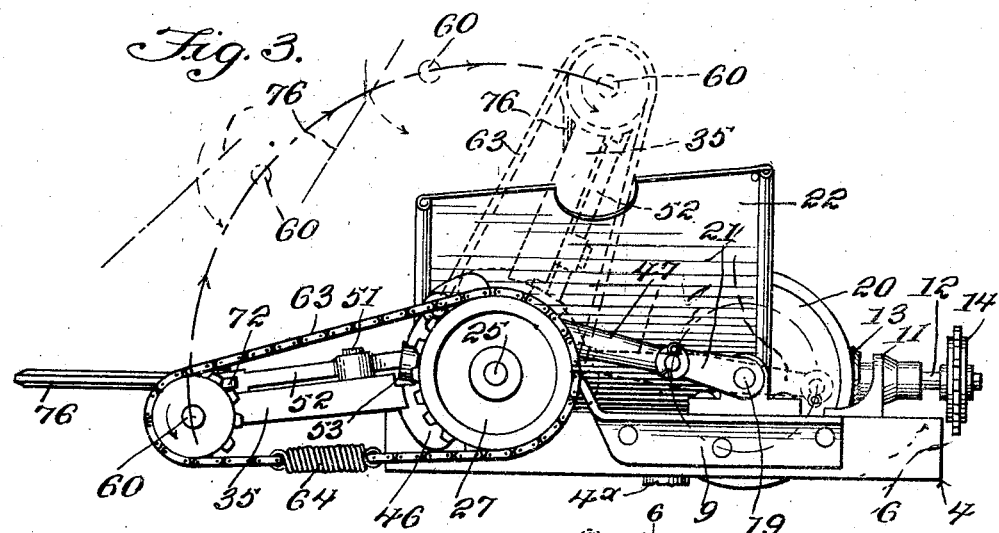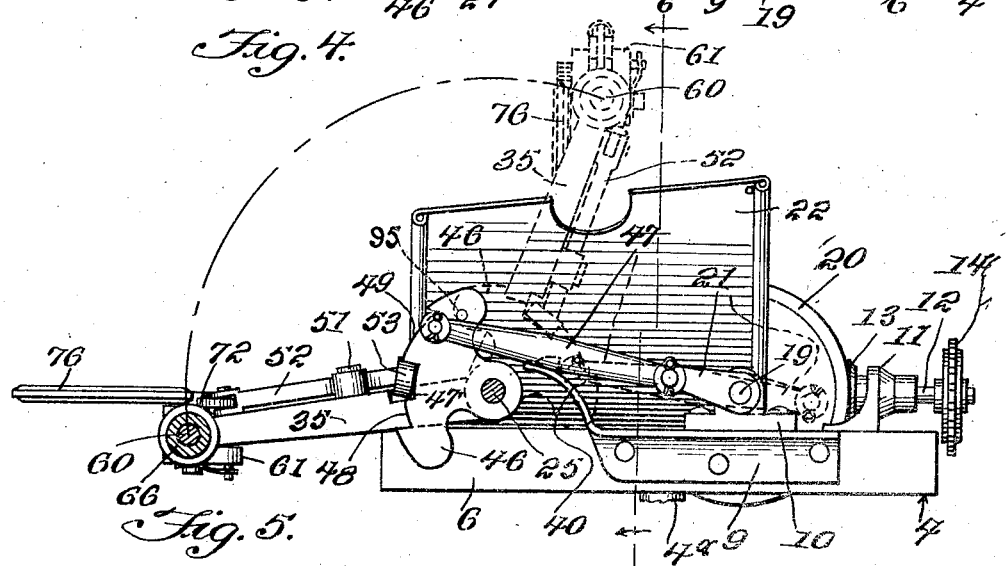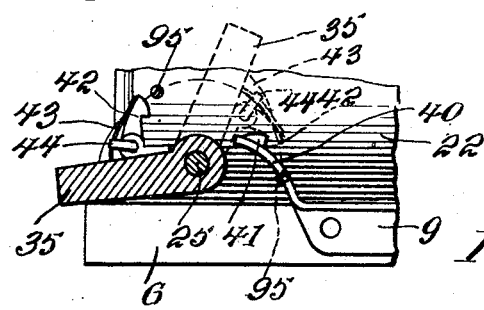

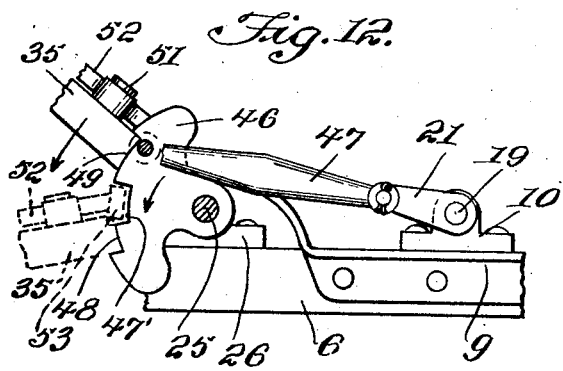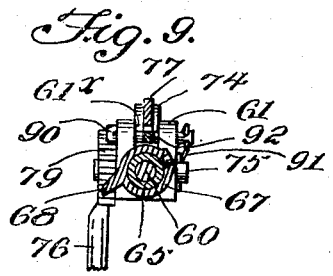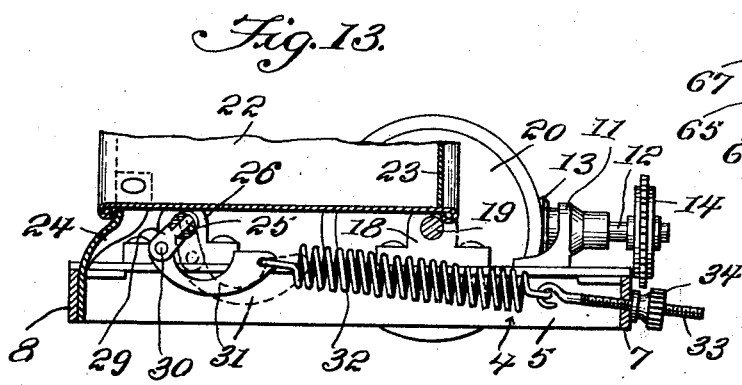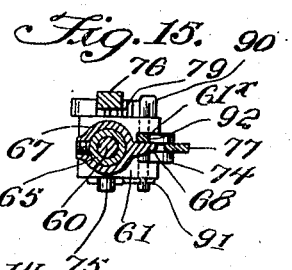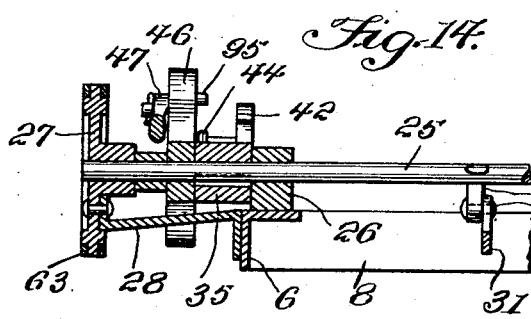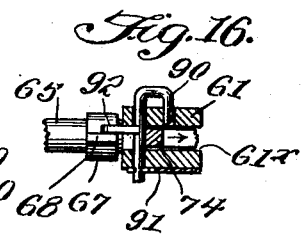

Patented Sept. 7, 1926.

1,599,296

UNITED STATES PATENT OFFICE.

KNUD SOLBERG, OF FREEMAN, SOUTH DAKOTA.

GRAIN SHOCKER.

Application filed October 10, 1924. Serial No. 742,885.

The object of my invention is to provide a sturdy and reliably operating shocker adapted to receive bundles of grain from a harvester binder and to adjust the bundles into shocks and to deposit the shocks on the ground back of the shocker.

Other objects and practical advantages of the invention will be fully understood from the following description and claims when the same are read in connection with the drawings, accompanying and forming part of this specification, in which:—

Figure 1 is a front elevation showing the preferred embodiment of my invention as properly arranged relative to a portion of a harvester binder.

Figure 2 is a top plan view of the same.

Figure 3 is a detail elevation showing the outer side of the mechanism and also showing parts by full and dotted lines in different positions.

Figure 4 is a detail section taken in the plane indicated by the line 4—4 of Figure 2.

Figure 5 is a detail section on the line 5—5 of Figure 2.

Figure 6 is a cross-section on the line 6—6 of Figure 4 showing the bundle grasping mechanism in its uppermost position.

Figure 7 is a section taken in the same plane as Figure 6, but showing the bundle grasping arms as closed.

Figure 8 is a detail section on the line 8—8 of Figure 7.

Figure 9 is a detail section on the line 9—9 of Figure 7.

Figure 10 is a detail view showing the means for moving the bundle grasping mechanism.

Figure 11 is a detail view of the same hereinafter explicitly referred to.

Figure 12 is a view similar to Figure 10 with the parts in different positions.

Figure 13 is a section on the line 13—13 of Figure 2.

Figure 14 is a detail view showing in section the appurtenance on the rear transverse shaft of the mechanism.

Figure 15 is a detail section similar to Figure 9, but with the latch released.

Figure 16 is a view similar to Figure 8, but with the latch released.

Similar numerals of reference designate corresponding parts in all of the views of the drawings.

The harvester binder of which I illustrate a portion is of the ordinary well known construction and need not therefore be described in detail except to say that its bull wheel is designated by 1, its deck by 2 and its frame by 3; and that bundles of grain are kicked down and off the deck 2 in the usual manner.

Among other elements my novel shocker comprises a main frame 4 appropriately connected at its inner end to the frame 3 of the harvester binder and supported adjacent to its outer end by a caster wheel 4×. The frame 4 is of open form and is made up of inner and outer longitudinal angle irons 5 and 6 and front and rear cross bars 7 and 8. On its outer side bar 6 the frame 4 is provided with a lateral bracket 9 and superimposed on and fixed to said bracket is a journal bearing 10, Figure 4. On its inner longitudinal bar 5 the frame 4 is provided with lateral brackets 11, and journaled in said brackets 11 is a longitudinal shaft 12, equipped at 13 with a miter gear and at 14 with a sprocket gear, the latter being connected by a sprocket belt 15, Figure 1, with a sprocket gear 16 carried by the frame 2, and designed to be connected by a pitman 17 appropriately connected to the mechanism of the harvester binder whereby the mechanism of the shocker will be driven from the harvester binder.

Journaled in the bearing 10 on the bracket 9 and also in a bearing 18 on the inner longitudinal bar 5 of the frame 4 is a transverse shaft 19 fixed at one end to a miter gear 20 and having fixed on its opposite end a crank arm 21, Figure 2. The miter gear 20 is meshed with the miter gear 13, and hence it follows that the shaft 19 will be rotated from the harvester binder through the driving connection described.

Arranged above the frame 4 is a cradle 22 which is preferably formed of sheet metal, closed at its rearward end by a swinging gate 23 and is open at its forward end. The said cradle 22 is connected with the rear bar 8 of the frame 4 by a bracket 24 fixed to the cradle and the frame bar.

Located in rear and in spaced relation to the shaft 19 is a transverse rock shaft 25 which is journaled in bearings 26 on the longitudinal bars 5 and 6 of the frame 4. The outer end of the said shaft 25 is arranged and adapted to turn in a sprocket gear 27 that is fixed to a bracket 28, which bracket 28, in turn, is fixed to the frame bar 6, Figure 7.

The rock shaft 25 is provided at 29, Figure 13, with a crank, and pivotally connected at 30 to the said crank is a curvilinear link 31 to one end of which is connected a retractile spring 32 the other end of which is connected to a threaded rod 33 which extends through the forward bar 7 of frame 4 in a loose manner and is equipped in front of said bar 7 with a nut 34 for regulating the tension of the spring. An arm 35 is fixed to the rock shaft 25 and is arranged to swing in a longitudinal vertical plane, and the spring 32 and its connections serve to cushion the upward and forward movement of the said arm 35 and also serve after the arm 35 has passed a certain point in its downward and rearward movement to suddenly and sharply complete the latter movement of the arm with a view to better releasing the shock which is deposited on the ground as hereinafter described.

The before mentioned bracket 9, Figures 3, 5, 10 and 11, is preferably formed of steel and is provided with an upwardly and rearwardly extending arm 40 on which is a beveled head 41. The said head 41 is designed to be engaged by a pivoted latch 42 on the arm 35, the said latch 42 being backed by a spring strip 43 and being provided with an arm 44 associated with the arm 35 to limit the movement of the latch 42 against the action of the spring strip 43. It will also be seen by reference to Figure 2 that the arm 35 is provided with an arcuate groove 45.

Loosely mounted on the rock shaft 25 and arranged at the outer side of the arm 35 is a swinging mover 46 for swinging the arm 35. The said mover 46, Figure 10, is connected by a pitman 47 with the crank arm 21 on the forward transverse shaft 19. The said arm mover 46 is provided with a step 48 in communication with a groove 47', Figure 10, and is also provided with a shallow step 49 forward of the groove 47'. The rear wall of the groove 47' is square but the forward wall thereof is cam shaped at its inner side as designated by 50 in Figure 6.

Pivoted or fulcrumed at 51 on the forward side of the arm 35 is a lever 52 having at its lower end a gudgeon or anti-friction roller 53. The said lever 52 is arranged to swing transversely of the shocker so as to move the gudgeon 53 from the groove 47' of the mover 46 into the arcuate groove 45 of the lever 35 and vice versa.

Journaled in the outer end portion of the arm 35 and extending transversely of the shocker is a rock shaft 60. The said rock shaft 60 is movable with the arm 35 from the position shown in Figure 7 to the position shown in Figure 3 and vice versa. Fixed to the inner end of the rock shaft 60 is a head 61, Figures 6 and 7, and fixed to the outer end of the rock shaft 60 is a sprocket gear 62. On the sprocket gear 62 and also on the fixed sprocket gear 27 and connecting and engaged with the said gears is a sprocket belt 63 a portion of the length of which is formed by a retractile spring 64 so as to enable the sprocket belt 63 to stretch and contract. Manifestly because of the connection described between the rock shaft 60 and the fixed gear 27, the shaft 60 will be turned about its axis when the arm 35 is swung rearwardly and downwardly and also when said arm 35 is swung upwardly and forwardly.

As shown in Figure 7 a sleeve 65 is arranged in and extends inwardly from the arm 35, said sleeve 65 abutting at one end against the head 61 and at its opposite end against a collar 66 that is fixed on the shaft 60 and is interposed between the arm 35 and the sprocket gear 62. Said sleeve 65 is fixed to the arm 35 and receives the rock shaft 60 and is provided at 67 with a fixed collar on which is a lug 68, Figures 8, 9, 15 and 16.

The sleeve 65 is loosely surrounded by a sleeve 69 which is movable in the direction of its length. Said sleeve 69 is flanged at its outer end as designated by 70 and is loosely arranged in a slidable member 71 connected by a pitman 72 with the upper arm of the lever 52.

As before described the head 61 is fixed to the inner end of the rock shaft 60. Said head 61 is provided at its inner end with an L-shaped extension 73 and it is also provided with a rectangular opening 61$^x$, Figure 7. In the said opening 61$^x$ is arranged a lever arm 74 which is fixed to a rock shaft 75 to which is fixed one of the bundle grasping arms 76, said arm 76 being arranged exterior of and alongside the head 61 as shown in Fig. 2. The lever arm 74 is connected by a link 77 with the sleeve 69 and is also connected by retractile spring 78 with the extension 73 of the head 61. At its heel end the arm 76 is provided with a spur gear 79 meshed with a spur gear 80 on a complementary bundle grasping arm 81 which latter is pivoted at 82 to the head 61. As best shown in Figures 7, 8 and 16 the head 61 is provided with a beveled latch 90 for cooperation with the lever arm 74, the latch being preferably L-shaped and movable transversely of the head 61 under the action of a spring strip 91 disposed at one side of the head 61. When the latch 90 is in the position shown in Figure 8, the lever 74 will manifestly be secured to hold the arms 76 and 81 in closed position. When, however, the shaft 60 is turned together with the head 61, an arm 92 on the latch 90 will abut against the lug 68 on the collar 67 with the result that the latch 90 will be moved against the action of the spring 91 and the lever arm 74 will be released from the latch 90 whereupon the retractile spring 78 will quickly open the arms 76 and 81 as appears in Figure 2. It will also be understood that when the arms 76 and 81 are closed as shown in Figure 7 the lever arm 74 will ride past the beveled latch 90 with the result that the said latch 90 will secure the arms 76 and 81 in closed position. This operation, of course, takes place when the arms 76 and 81 are located as shown in Figure 6 and after the said arms have been moved to the position shown in Figure 7 in order to grasp a plurality of bundles in the cradle 22.

The swinging mover 46 is provided at 95 with a lateral pin desired on rearward movement of said mover to engage the arm 44 of the clutch 42 and lift said latch out of engagement with the keeper head 41, Figure 5.

The operation of the shocker will be understood when it is stated that when the parts are positioned as shown in Figure 2 and by full lines in Figure 3 after the deposit of a shock on the ground, the continuing rotation of the shaft 12 will swing the mover 46 and the arm 35 upwardly and forwardly to the position shown by dotted lines in Figure 4, and the arm 35 will be latched and temporarily secured into raised position by the cooperation of the latch 42 with the keeper head 41. On said movement the arm 35 moves forwardly relative to the mover 46 and the rock shaft 60 is turned about its axis so as to position the bundle grasping arms 76 and 81 as shown in Figure 6. As the arm 35 moves forwardly and reaches its uppermost position it is temporarily locked by the engagement of the latch 42 with the head 41, and the mover 46 will move rearwardly and cause the cooperation of the gudgeon 53 with the cam portion 50 of the swinging mover 46 and the arms 76 and 81 will be closed about the bundles of grain. When the arms 76 and 81 are closed as stated the latch 90 will automatically engage the lever arm 74 and secure said arms in the closed position. It will also be noted that on the rearward movement of the swinging mover 46 the forward shoulder thereof will engage the arm 35 to move said arm downwardly and rearwardly and the pin 95 will engage the arm 44 and release the latch 42 from the keeper head 41 whereupon the spring 32 will assist the arm 35 in its movement. Incident to such movement of the arm 35 the arms 76 and 81 will be moved into proper position by the rocking of the shaft 60 and the head 61 by the connection described. On such rocking the arm 92 of the latch 90, Figure 8, will be engaged by the lug 68 on the collar 67 with the result that the latch 90 will be moved out of engagement with the lever arm 74, when the spring 78 will quickly contract and open the arms 76 and 81 to deposit a shock, after which the arm 35 will be moved forwardly and upwardly by the swinging mover 46 and the operation described will be repeated. As the arm 35 reaches its lowermost position and the bundles in the arms 76 and 81 are released, the shock will be stood on the ground and the forward movement of the shocker will enable said arms 76 and 81 to clear the shock.

While I prefer to employ the retractile spring 64 in the belt 63, I do not desire to be understood as confining myself to the same inasmuch as the connection including the belt 63 may be made to work accurately without employment of the spring 64. I also do not desire to be understood as confining myself to the specific construction and relative arrangement of the parts of the organized mechanism as disclosed inasmuch as the scope of my invention is defined by my appended claims within which changes may be made without involving departure from my invention.

Having described my invention, what I claim and desire to secure by Letters-Patent, is:—

1. A shocker comprising a frame, means supporting the same, a cradle arranged above and carried by said frame, bundle grasping arms movable from a position above and at right angles to the length of the cradle to a position in rear of the cradle and at right angles to their first-named position, means for moving the bundle grasping arms, means for closing said arms when the same are in their first named position, and means for locking said arms in said closed state.

2. In a shocker, the combination of a frame, means supporting the same, a longitudinally and vertically swinging arm carried by the frame, a cradle connected to and arranged above the frame, a rock shaft carried by and extending laterally from said swinging arm and movable by the arm from a position above the cradle to a position in rear of the cradle, means for rocking the shaft incident to swinging movements of the swinging arm, swinging bundle grasping arms carried by said rock shaft, means for automatically releasing said arms, means for opening the arms when so released, means for closing the bundle grasping arms on upward and forward movement of the said swinging arm, means for latching the bundle grasping arms in closed position, means for swinging the swinging arm upwardly and forwardly, and means for swinging said swinging arm downwardly and rearwardly.

3. In a shocker, the combination of a frame, means supporting the same, a longitudinally and vertically swinging arm carried by the frame, a cradle connected to and arranged above the frame, a rock shaft carried by and extending laterally from said swinging arm and movable by the arm from a position above the cradle to a position in rear of the cradle, means for rocking the shaft incident to swinging movements of the swinging arm, bundle grasping arms carried by said rock shaft, means for automatically releasing said arms, means for opening the arms when so released, means for closing the bundle grasping arms on upward and forward movement of the said swinging arm, means for latching the arms in closed position, means for swinging the swinging arm upwardly and forwardly, means for latching the swinging arm in its forward position and means for unlatching said swinging arm to permit of rearward movement thereof.

4. In a shocker, the combination of a frame, a cradle carried thereby, a rock shaft carried by said frame, a longitudinally and vertically swinging arm fixed to the rock shaft and having a groove, a rock shaft carried by the longitudinally swinging arm and movable to and from a position above the cradle, means for turning said rock shaft about its axis incident to movement of the longitudinally swinging arm, a lever mounted on said swinging arm and having a gudgeon movable in said groove, a swinging mover loosely mounted on the rock shaft and having a cam to engage said gudgeon and also having means to engage and swing the longitudinally swinging arm and further having a pin, means for detachably securing the said swinging arm in its forward position and operable by said pin to release said arm on rearward movement of the swinging mover, a head carried by the rock shaft carried by the swinging arm, bundle grasping arms carried by said head, means operable by said lever for closing said bundle grasping arms, means for automatically locking said bundle grasping arms in closed position, means for automatically unlocking said bundle grasping arms, means for opening the bundle grasping arms when unlocked, and means for swinging the said swinging mover.

5. In a shocker, the combination of a frame, a cradle carried thereon, a rock shaft journaled on the frame, a longitudinally and vertically swinging arm fixed to said rock shaft, a swinging mover loosely mounted on the rock shaft and having spaced abutments to engage and swing said swinging arm and also having a cam portion, a lever mounted on the swinging arm and movable by said cam portion, a rock shaft carried by the swinging arm and adapted in one position to rest above the cradle, means for turning said rock shaft about its axis on swinging movements of said swinging arm, a head carried by said rock shaft, bundle grasping arms connected together and carried by said head, a lever arm connected to one of said bundle grasping arms, means cooperating with said lever arm to automatically lock said bundle grasping arms in closed position, means for automatically unlocking said bundle grasping arms, means for opening said bundle grasping arms when unlocked, means slidable on the rock shaft and connected to said lever arm and also connected to the lever on the swinging arms for closing said bundle grasping arms, and means for moving the said swinging mover.

6. In a shocker, the combination of a frame, a cradle carried thereon, a rock shaft journaled on the frame, a longitudinally and vertically swinging arm fixed to said rock shaft, a swinging mover loosely mounted on the rock shaft and having spaced abutments to engage and swing said swinging arm and also having a cam portion, a lever mounted on the swinging arm and movable by said cam portion, a rock shaft carried by the swinging arm and adapted in one position to rest above the cradle, means for turning said rock shaft about its axis on swinging movements of said swinging arm, a head carried by said rock shaft, bundle grasping arms connected together and carried by said head, a lever arm connected to one of said bundle grasping arms, means cooperating with said lever arm to automatically lock said bundle grasping arms in closed position, means for automatically unlocking said bundle grasping arms, means for opening said arms when unlocked, means slidable on the rock shaft and connected to said lever arm and also connected to the lever on the swinging arms for closing said bundle grasping arms, and means for moving the said swinging mover, the said swinging arm having a latch for securing it in an upper and forward position, a complementary keeper and the said swinging mover having means for releasing said latch from the complementary keeper on the initial rearward movement of the said swinging mover.

7. The combination in a shocker, of a frame, a cradle carried by the frame, a longitudinally and vertically swinging arm supported on the frame, means for swinging said arm, a rock shaft carried by said swinging arm and adapted in one position to rest above the cradle, means for turning said rock shaft incident to swinging movement of said swinging arm, bundle grasping arms carried by the rock shaft and connected together, means for opening said bundle grasping arms, means for closing said last mentioned arms, means for locking the last mentioned arms when closed, and means for unlocking the bundle grasping arms.

8. The combination in a shocker, of a frame, a rock shaft journaled in the frame and having an arm, a retractile longitudinally disposed spring interposed between and connected to said arm and the frame, a longitudinally and vertically swinging arm connected with the rock shaft, means for swinging said arm last mentioned downwardly and rearwardly, a rock shaft carried by the swinging arm, means for turning said rock shaft incident to swinging movement of the arm, bundle grasping arms carried by said rock shaft and connected together, means including a cam operable for closing said bundle grasping arms, means for locking said bundle grasping arms in closed position, means for automatically unlocking said bundle grasping arms incident to turning of said rock shaft, and means for opening the bundle grasping arms when unlocked.

9. The combination in a shocker, of a frame, a cradle carried thereby, a rock shaft journaled in bearings on the frame, a sprocket gear fixed to the frame, a longitudinally and vertically swinging arm fixed to said rock shaft, a rock shaft carried by said swinging arm and having a sprocket gear, a sprocket belt connecting said sprocket gear with the fixed sprocket gear, means for swinging said longitudinally swinging arm in opposite directions, bundle grasping arms connected together by intermeshed gears and carried by the rock shaft on the longitudinally swinging arm, means for closing said bundle grasping arms, means for locking said bundle grasping arms in closed position, means for automatically unlocking said bundle grasping arms, and means for opening said bundle grasping arms when the same are unlocked.

10. In a shocker, the combination of a frame, a cradle carried thereby, a rock shaft journaled in bearings on the frame and having an arm, a retractile spring interposed between and connected with said arm and a forward portion of the frame, a swinging mover loosely mounted on said rock shaft and having spaced abutments and also having a cam portion and a lateral pin, a beveled keeper head connected with the frame, means for swinging said swinging mover, a sprocket gear fixed to the frame, a longitudinally and vertically swinging arm fixed to said rock shaft, a rock shaft carried by and extending laterally from said longitudinally swinging arm and adapted in one position to rest above the cradle and having a sprocket gear connected with the fixed sprocket gear, a lever carried by said longitudinally swinging arm when arranged to be rocked by said cam portion, a latch on said longitudinally swinging arm and arranged to engage said keeper head and to be disengaged from said head by said pin of the swinging mover, a head on the rock shaft carried by the longitudinally swinging arm, a slide on said rock shaft and connected with the cam controlled lever, bundle grasping arms connected together and carried by said head, a connection between one of said bundle grasping arms and said slide, means for locking said bundle grasping arms in closed position, means for automatically unlocking said bundle grasping arms, and means for opening said bundle grasping arms when the same are unlocked.

In testimony whereof I affix my signature.

KNUD SOLBERG.